United States Patent [19]
Chieh et al.

[11] Patent Number: 5,345,796
[45] Date of Patent: Sep. 13, 1994

[54] VEHICLE BRAKE-PEDAL LOCKING DEVICE

[76] Inventors: Peter T. C. Chieh, 10531 Perch Ave., Fountain Valley, Calif. 92708; George Kun-Ling Fang, 9799 Red River Cr., Fountain Valley, Calif. 92708; Franklin W. Baker, 1502½ N. LaBrea, Inglewood, Calif. 90302

[21] Appl. No.: 27,446

[22] Filed: Mar. 8, 1993

[51] Int. Cl.$^5$ .............................................. B60R 25/08
[52] U.S. Cl. ........................................ 70/202; 70/237; 70/254
[58] Field of Search ................ 70/254, 228, 237–239, 70/261, 198–203

[56] References Cited

U.S. PATENT DOCUMENTS

| | | | |
|---|---|---|---|
| 1,360,534 | 11/1920 | Johnson | 70/203 |
| 1,362,377 | 12/1920 | Weidner | 70/203 |
| 1,389,966 | 9/1921 | Morris | 70/203 |
| 1,531,062 | 3/1925 | Barravecchia | 70/202 |
| 1,533,736 | 4/1925 | Humphrey et al. | 70/203 |
| 1,569,721 | 1/1926 | Dalferes | 70/202 |
| 2,078,724 | 4/1937 | Dupuis | 70/202 |
| 3,690,131 | 9/1972 | Davis | 70/203 |
| 4,825,671 | 5/1989 | Wu | 70/202 X |
| 5,121,617 | 6/1992 | Chen | 70/209 |
| 5,181,404 | 1/1993 | Baker | 70/203 |

FOREIGN PATENT DOCUMENTS

| | | | |
|---|---|---|---|
| 0850440 | 8/1981 | U.S.S.R. | 70/238 |

*Primary Examiner*—Lloyd A. Gall
*Attorney, Agent, or Firm*—Albert O. Cota

[57] ABSTRACT

An improved motor vehicle brake-pedal locking device (10) that mechanically maintains the vehicle brake-pedal (60) in a depressed position to prevent the vehicle from being driven. The device includes a horizontally and vertically pivoting brake-pedal swing-arm interfacing structure (12) that is disclosed in two designs. Both designs include a channel (12A),(38C) that engages the brake-pedal swing-arm (62). To the back end (18B),(34B) of the structure (12) is attached the back end (50B of a locking tube (50). Inserted into this locking tube (50), is a locking rod (52) having attached to its back end (52B) a forked section (56A) that attaches to a vehicle seat (64). The device is installed by placing the structure (12) over the swing-arm (62) and the forked section (56A) secured to the seat (64). The device (10) is then depressed to place the brake-pedal (60) in a depressed position in which position the device is locked in place.

20 Claims, 6 Drawing Sheets

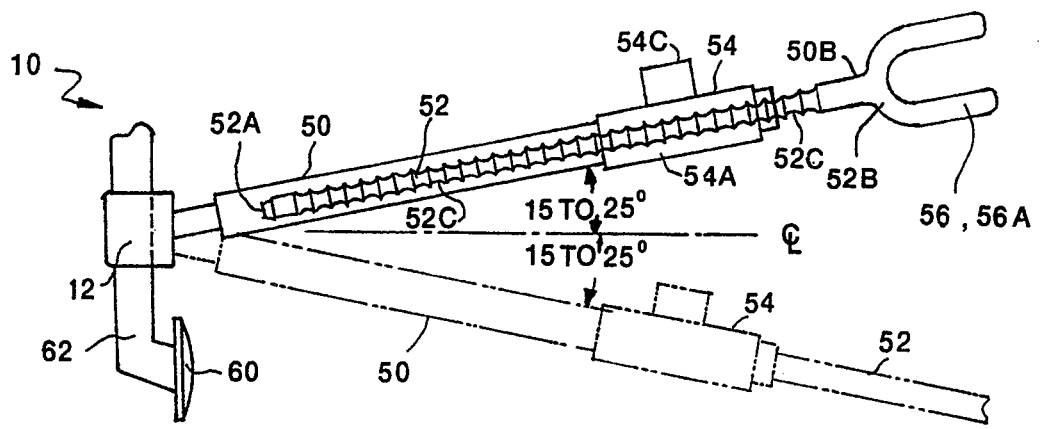
FIG. 4
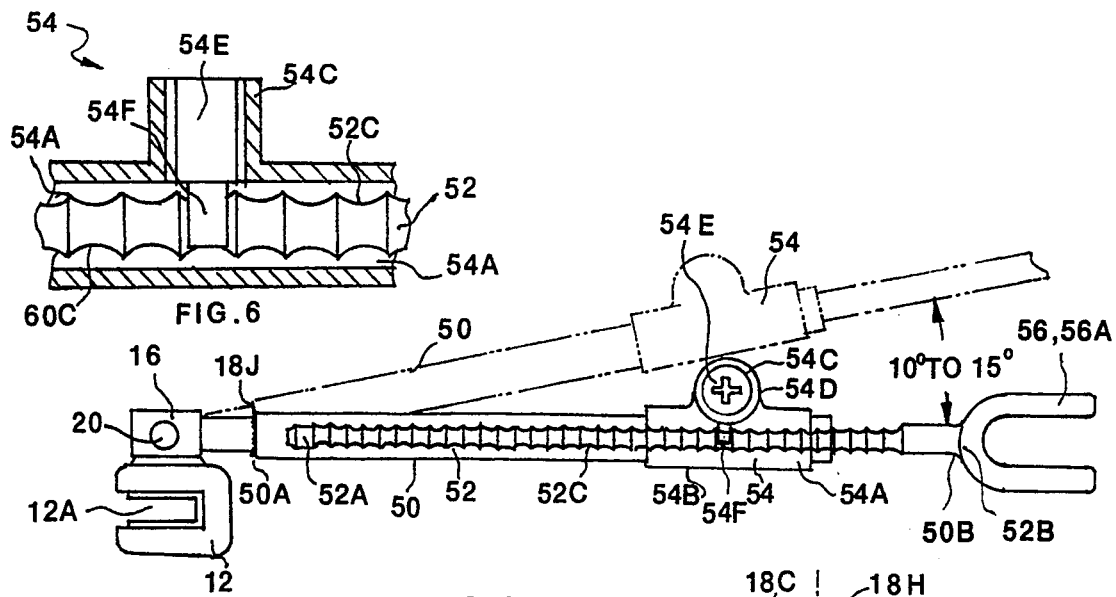
FIG. 6
FIG. 5
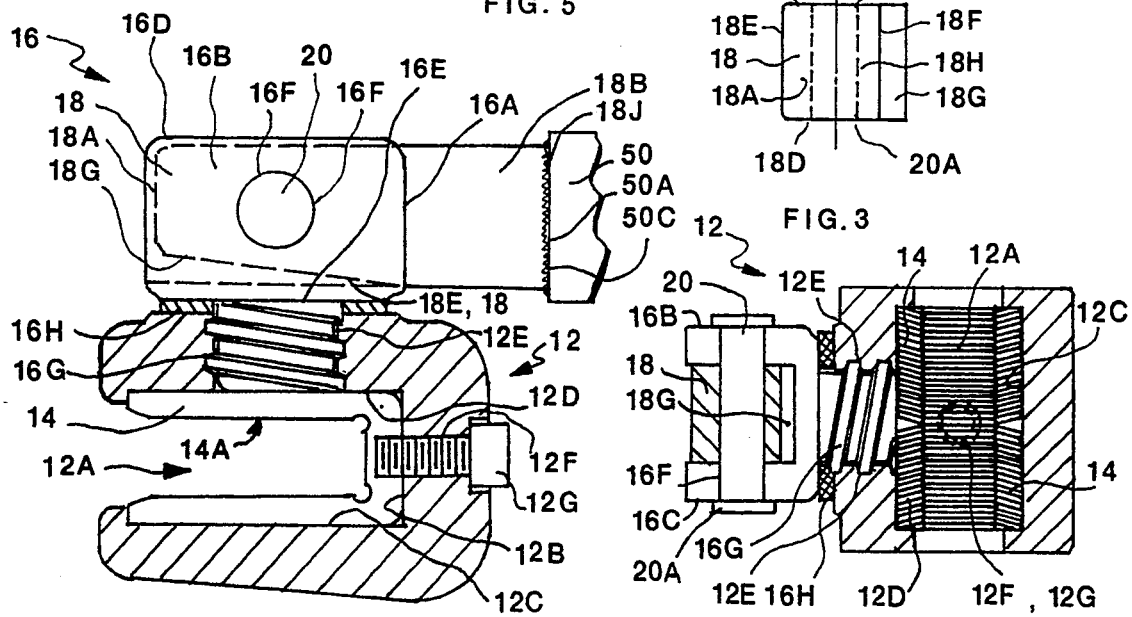
FIG. 1
FIG. 3
FIG. 2

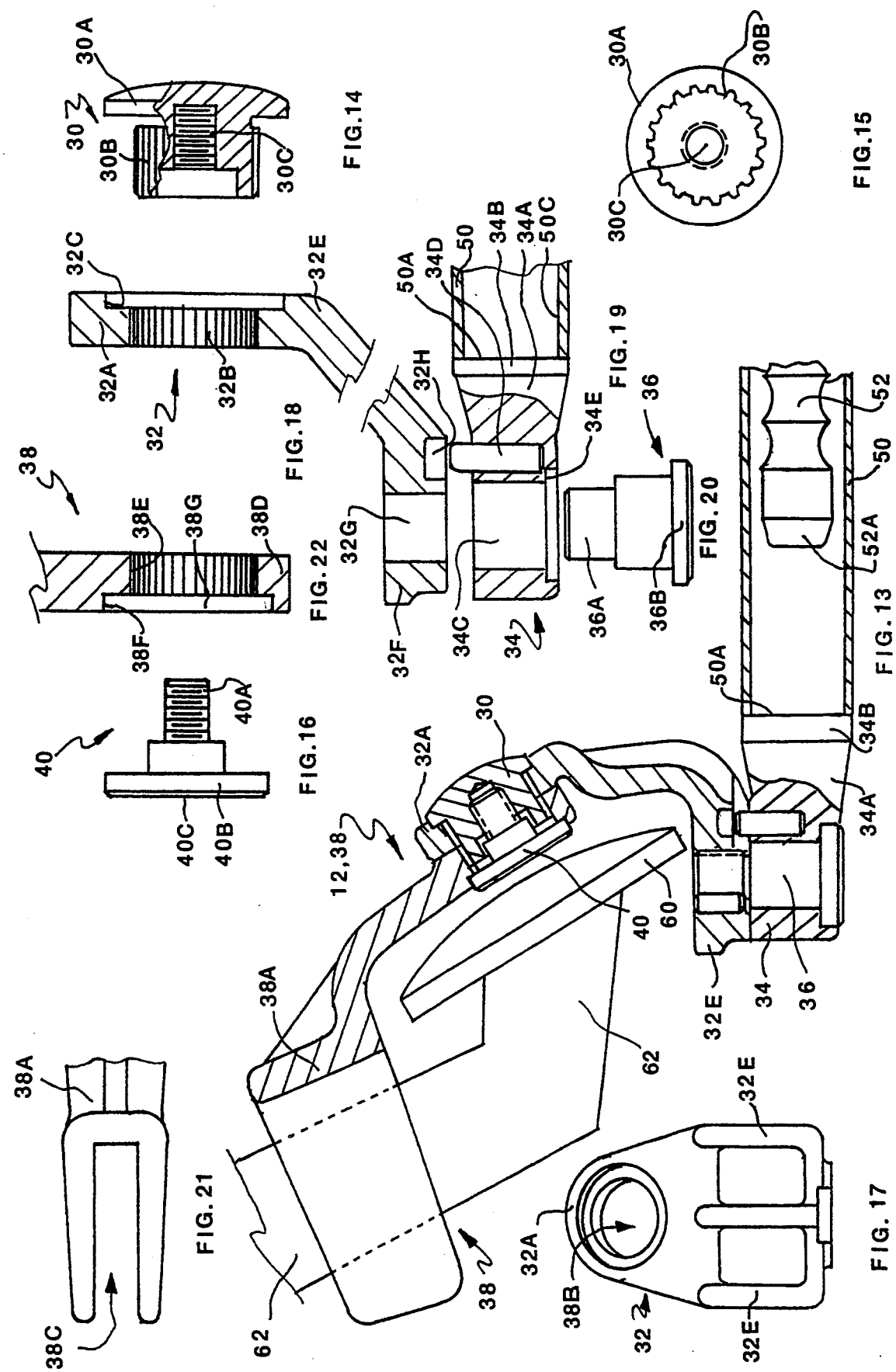

5,345,796

VEHICLE BRAKE-PEDAL LOCKING DEVICE

TECHNICAL FIELD

The invention generally pertains to anti-theft devices for vehicles. More particularly, the invention pertains to an improved vehicle brake-pedal locking device that adjusts vertically and horizontally to allow attachment to various configurations of brake-pedal swing-arms; when so attached, the device maintains the brake-pedal in a depressed position to prevent the vehicle from being driven.

BACKGROUND ART

In the prior art, there are currently many types of locking devices that are used in combination with the brake-pedal of a vehicle such as an automobile or truck, to prevent the unauthorized use or theft of the vehicle. These devices generally employ a mechanical means that maintains the vehicle brake-pedal in a depressed position which locks the brakes to prevent the vehicle from being driven, Other devices range from electrically operated latches or mechanical hooks, yokes, brackets and bars all of which maintain the brakes in a depressed position. The major problem with the prior art devices is that the driver or passenger in many cases, will neglect to attach the device when the vehicle is parked or otherwise not in use. This negligence is primarily due to the device's lack of simplicity which prevents them from being easily and conveniently attached and detached. Additionally, none of the brake-pedal locking devices disclosed in the prior art or in the applicant's prior applications offer a device that provides not only a longitudinal adjustment but also vertical and horizontal adjustments. These additional adjustments allow the instant invention to be attached in vehicles with straight or angled brake swing-arms and various seat-structural elevations to where the back end of the device is attached.

A search of the prior art did not disclose any patents that read directly on the claims of the instant invention. However, the following U.S. patents were considered related:

| U.S. PAT. NO. | INVENTOR | ISSUED |
| --- | --- | --- |
| 5,001,913 | Gamboni | 26 March 1991 |
| 4,903,510 | Surles | 27 February 1990 |
| 4,876,865 | Trinidad | 31 October 1989 |
| 4,779,435 | Farrow | 25 October 1988 |
| 4,333,326 | Winters | 8 June 1982 |
| 4,076,095 | Adamski | 28 February 1978 |
| 1,444,379 | Jones | 6 February 1923 |

Gamboni in U.S. Pat. No. 5,001,913 discloses a locking mechanism fixed to the firewall of a vehicle with a set of pawls grasping a locking bar attached to the brake-pedal. A key lock and ratchet mechanically actuate the locking mechanism.

Surles in U.S. Pat. No. 4,903,510 discloses a hook member locked through the floorboard grasping the vehicle brake-pedal. A key actuated deadbolt locks the hook member to the floorboard.

Trinidad in U.S. Pat. No. 4,876,865 discloses a pair of pivotal plate members which are locked to the brake pedal by means of a first locking arrangement. A second locking arrangement fixedly connects and locks a lower portion of the second, downwardly extending plate member to the floor of the vehicle. This second lock keeps and locks the device and the brake-pedal in a depressed position.

Farrow in U.S. Pat. No. 4,779,435 discloses a yoke that is located below the brake-pedal and a hook grasping the spoke of the steering wheel. A lock pin is secured with a padlock forming a mechanical link between the steering wheel and brake.

Winters in U.S. Pat. No. 4,333,326 discloses a base permanently attached to a vehicle floorboard with two members extending upward one on each side of the brake pedal and a padlock retaining the pedal rendering the brake inoperative.

Adamksi in U.S. Pat. No. 4,076,095 discloses a pair of parallel bars that are installed between the brake and clutch pedal of a vehicle. This arrangement includes supports preventing either pedal from becoming depressed and a lock with a depressing pin maintaining security of the apparatus and ultimately, the vehicle.

Jones in U.S. Pat. No. 1,444,379 discloses a device having a first end and a second end. The first end attached to the floorboard of an automobile and the second end embraces the clutch (brake) pedal when in the depressed position. The device includes an upper pivot that allows the device to be stowed in an upper position when not in use.

For background purposes and as indicate of the art to which the invention is related reference may be made to the remaining cited patents.

| PATENT NO. | INVENTOR | ISSUED |
| --- | --- | --- |
| 5,181,404 | Baker | 26 June 1993 |
| 5,001,913 | Gamboni | 26 March 1991 |
| 2,198,403 (UK) | Soltan | 15 June 1988 |
| 4,333,326 | Winters | 6 June 1982 |
| 997,868 (UK) | Burton | 7 July 1965 |

DISCLOSURE OF THE INVENTION

The improved vehicle brake-pedal locking device allows a person to easily and positively place and maintain the vehicle brake-pedal in a depressed position to prevent the vehicle from being driven. Two embodiments of the invention are disclosed. In each design, the common denominator is the provision that allows a brake-pedal swing-arm interfacing structure to be adjusted both vertically and horizontally. This provision allows the front end of the device to be attached to brakes having a brake-pedal swing-arm that extend vertically or that angles inwardly into the brake-pedal. Also, this provision allows the back end of the device to be attached to vehicle-seat base structures having various heights and lateral displacements.

In its basic design, which is applicable to both embodiments, the improved vehicle brake-pedal locking device is comprised of:

1. a brake-pedal swing-arm interfacing structure having a means fop allowing the structure to be attached to the brake-pedal swing-arm. The structure is designed to pivot vertically in the same plane as the left and right sides of the brake-pedal and to pivot horizontally in the same plane as the upper and lower sides of the brake-pedal,
2. a locking tube having a front end and a back end. The front end is attached by an attachment means, to the brake-pedal swing-arm interfacing structure, 3. a locking rod having a front end, a back end and a diameter that allows the pod to slidably traverse through the locking tube,
4. a rod locking means that is attached to the back end of the locking tube. The locking means has a rod bore therethrough that is aligned with the locking tube. When the locking rod is inserted through the rod bore and through the locking tube the locking means can be activated to lock the locking rod at a selectable length, and
5. a vehicle seat interfacing structure attached to the back end of the locking rod. The interfacing structure is configured to allow the device to be held in-place when the interfacing structure interfaces with a structural member of the vehicle-seat base structure.

To use the device, the seat is moved to its furthest back position, the brake-pedal swing-arm interfacing structure is placed over the brake-pedal swing-arm and the vehicle-seat interfacing structure is placed against a vehicle-seat base structure. The brake-pedal is then depressed by means of the feet which in turn, causes the brake-pedal to be placed in its depressed, braking position. The rod locking means is then activated which locks the locking rod in place and allows the brake-pedal locking device to maintain the brake-pedal in the depressed braking position.

The device has sufficient strength to preclude removal with conventional tools and locks the brakes on all four wheels of the vehicle with all of the wheels locked, a conventional tow truck cannot lift the vehicle from one end or move it at all. Even rolling onto a towing platform type vehicle is eliminated as caster skids would be required on all four wheels which is difficult to do quickly as each end of the vehicle would require lifting.

An important object of the invention is that even if a thief opened the vehicle and turned on the ignition, it would be impossible to drive away as the engine power would not overcome the resistance of the brakes, thus, maintaining the security of the vehicle.

Another object of the invention is directed to the use of a key lock to secure the locking rod to the locking tube to prevent the device from being removed.

Still another object of the invention is to provide an anti-theft device that is simple in construction, relatively easy to manufacture and yet rugged and durable enough to thwart any thief.

Yet another object of the invention is the strength of the device that would discourage the thief and yet the device is small enough to be easily carried in the vehicle and installed instantly by hand then locked securely by the driver's feet.

A further object of the invention is that the device is cost effective from both a manufacturer's and consumer's point of view.

These and other objects and advantages of the present invention will become apparent from the subsequent detailed description of the first and second embodiments and the claims taken in conjunction with the accompanying drawings.

BRIEF DESCRIPTION OF THE DRAWINGS

FIG. 1 is a top, partial, sectional view of the brake-pedal swing-arm interfacing structure of the first embodiment.

FIG. 2 is a front, partial, sectional view of the structure of FIG. 1.

FIG. 3 is a front, elevational view of the front solid structure as used in the structure of FIG. 1.

FIG. 4 is a side view of the improved vehicle brake-pedal locking device attached to a brake-pedal swing-arm and showing the vertical displacement available.

FIG. 5 is a top, plan view of the device showing the horizontal displacement available.

FIG. 6 is a partial, sectional view of a preferred locking structure for locking the locking rod in place.

FIG. 13 is a side, partial, sectional view of the structure of FIG. 12.

FIG. 14 is a side, partial, sectional view of the front cap.

FIG. 15 is a back view of the front cap.

FIG. 16 is a side view of the rear cap-engaging bolt.

FIG. 17 is a front view of the brake-pedal contact structure.

FIG. 18 is a side, partial, sectional view of the brake-pedal contact structure.

FIG. 19 is a side, partial, sectional view of the lower rotating rod structure attached to the locking tube.

FIG. 20 is a side view of the pivot pin that attaches the brake-pedal contact structure to the lower rotating rod structure.

FIG. 21 is a top, plan view of the swing-arm channel attached to the swing-arm interfacing section.

FIG. 22 is a partial, sectional view of the swing-arm interfacing structure.

BEST MODE FOR CARRYING OUT THE INVENTION

Figure 7:
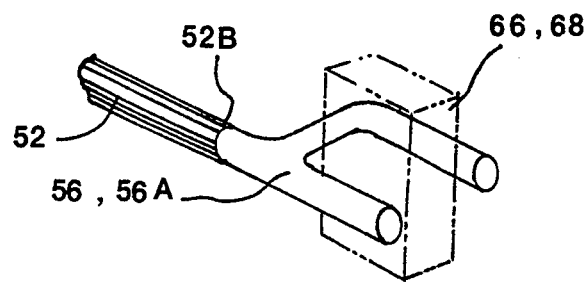
FIG. 7 is a perspective view of a vehicle seat interfacing structure in the form of a forked section attached over a vehicle seat post.

The best mode for carrying out the improved brake-pedal locking device is presented in terms of two embodiments. Both embodiments allow an individual to mechanically and easily place a vehicle brake-pedal in a compressed, braking position to prevent the vehicle from being driven. The two device embodiments are similar with the exception of the design for a brake-pedal swing-arm interfacing structure.

The first embodiment which is shown in FIGS. 1-11 and 26-28 is comprised of the following major elements: a brake-pedal swing-arm interfacing structure 12, an optional flexible gripping insert 14, a front hollow structure 16, a front solid section 18, a swivel pin 20, a brake-light disabling circuit 28, a device holding insert 46, a locking tube 50, a locking rod 52, a rod locking means 54 and a vehicle seat interfacing structure 56. The above elements function in combination with a vehicle brake-pedal 60 that is attached to a brake-pedal swing-arm 62, a seat 64 and a vehicle-seat base structure 66 represented by a vehicle seat post 68.

The brake-pedal swing-arm interfacing structure 12 as best shown in FIGS. 1 and 2, consists of a U-shaped section having a front opening channel 12A. The channel which is sized to fit over the brake-pedal swing-arm 62, has a back section 12B, an outward side section 12C and an inward side section 12D. On the inward side section 12D is located a substantially centered threaded swing-screw bore 12E therethrough.

Figure 10:
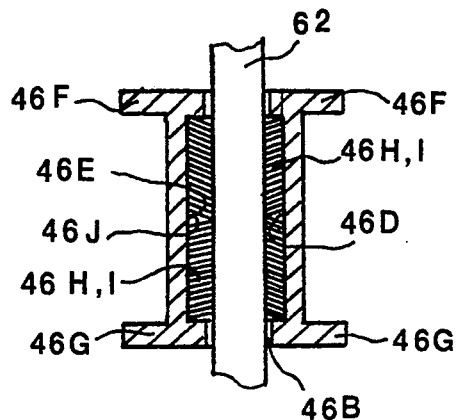
FIG. 10 is a back, partial, sectional view of a device holding insert installed over a brake-pedal swing-arm.

As shown in FIGS. 1 and 2, an optional flexible gripping insert 14 may be inserted into the front opening channel 12A. The insert is also in a U-shape and is attached by an attachment means to the inward side section 12D and the back section 12B. The attachment may simply be made by inserting a threaded bolt 12G into a threaded bore 12F as also shown in FIG. 1. With this attachment scheme, the inward section 14A remains flexible thus, when the swing screw 16G is rotated, a force is applied to the insert's inward section 14A. This force then allows the inward section 14A to move outwardly, that is toward the brake-pedal swing-arm 62, and place a gripping force on the brake-pedal swing-arm 62. The insert 14 may be made with cross-angled teeth as shown in FIG. 10. This teeth combination aids to maintain the insert secured to the brake-pedal swing-arm 62.

The structure 12 includes a front, substantially square, hollow structure 16 that has a back opening 16A, a top section 16B, a bottom section 16C, an outward section 16D and an inward section 16E. Through the top and bottom sections 16B, 16C as best shown in FIG. 2, is a first pin bore 16F and extending from the outward section 16D is a swing screw 16G. The swing screw is sized to screw into the threaded swing screw bore 12E to allow the front hollow structure 16 to pivot vertically up or down from between 15 to 25 degrees as measured from a horizontal center line (CL) that traverses through the center of the structure 12 as shown in FIG. 4.

To facilitate the pivoting action, a washer 16H may be inserted over the swing screw 16G between the inward section 16E of the hollow structure 16 and the inward side section 12D of the swing-arm interfacing structure 12.

The front hollow structure 16 as is sized to contain the front solid section 18 as shown in FIGS. 1 and 2. The solid section preferably has a square cross section as best shown in FIG. 3, and as also shown in FIGS. 2 and 3, includes a front end 18A, a back end 18B which constitutes the back end of the brake-pedal swing-arm interfacing structure 12, a top surface 18C, a bottom surface 18D, an outer surface 18E and an inward surface 18F. The inward surface has a taper 18G, as best shown in FIG. 1, that tapers towards the front end 18A. Through the top and bottom surfaces 18C, 18D is located a second pin bore 18H that is in alignment with the first pin bore 16F on the front hollow structure.

The front hollow structure 16 and the front solid section 18 are swivelly connected by a swivel pin 20 that is inserted through the first and second pin bores 16F, 18H. The pin as shown in FIG. 2 has a head 20A that retains the pin on one end; the other end may be retained by a snap cap or a cottar pin (not shown). The pin allows the front solid section 18 to pivot horizontally from between 10 to 15 degrees as measured from a vertical line that traverses through the center of the swivel pin 20 as shown in FIG. 5. The amount of the horizontal swing is limited by the taper 18G on the solid section 18.

As shown in FIGS. 1, 4 and 5, the back end of the front solid section 18 is inserted into and attached to the front end 50A of the locking tube 50 by an attachment means. This attachment means may consist of a bolt and nut combination, rivets or preferably by welding 18J as shown in FIG. 1.

The back end 50B of the locking tube 50 is attached to one side of the rod locking means 54. In the preferred embodiment, the rod locking means 54 is comprised of a locking structure 54B that includes a rod bore 54A. When the structure is attached to the locking tube, the bore 54A is aligned with the locking tube 50 and is sized to slidably accept the locking rod 52 described infra, as shown in FIGS. 4 and 5. As shown in FIGS. 5 and 6, the structure 54B has at least one laterally extending side 54D that extends beyond the diameter of the locking tube 50. On the top surface of the structure is a key-lock cylinder keeper 54C that is attached along the edge of one of the laterally extending sides 54D of the structure 54. Into this keeper as shown best in FIG. 6, is inserted and retained a key-lock cylinder 54E. The cylinder includes a key-moved latch 54F that when placed in its locked position by a key as also shown in FIG. 6, the latch 54F extends into the rod bore 54A and into one of the locking serrations 52C on the locking rod 52. When so engaged, the latch 54F maintains the improved vehicle brake-pedal locking device 10 in its locked position.

To provide a convenient access to the key-lock cylinder 54E, the structure 54 is attached to the locking tube 50 as close as possible to the edge of the vehicle seat 64.

The element that allows the device to be longitudinally extended to selectable lengths is the locking rod 52. As shown in FIGS. 4, 5 and 6, the rod has a front end 52A, a back and 52B and a diameter that allows the rod to slidably traverse through the locking tube 50 and the rod locking means 54. Although a round rod is preferred, a square rod may also be used. The locking rod includes a serrated section that extends longitudinally along the rod from near the front end 52A to near the back end 52B as shown in FIGS. 4 and 5. The serrated section includes a multiplicity of locking serrations 52C that are concave in shape and extend around the diameter of the rod 50 as best illustrated in FIG. 6.

The final element that comprises the device 10 is the vehicle seat interfacing structure 56 that is attached to the back end 52B of the locking rod 52 as shown in FIGS. 4, 5 and 7. The interfacing structure 56 is configured to allow the device 10 to be rigidly held in place when the interfacing structure interfaces with a vehicle-seat base structure 66 that is represented by a vehicle seat post 68 as shown in FIG. 7. The preferred interfacing structure 58 is a forked section 56A as best shown in FIG. 7. When the forked section is in place and the brake-pedal swing-arm interfacing structure 12 is inserted into the brake-pedal swing-arm 62 as shown in the device attachment sequence of FIGS. 26–28, the device 10 may be operated as described later in the OPERATION section.

Figure 8:
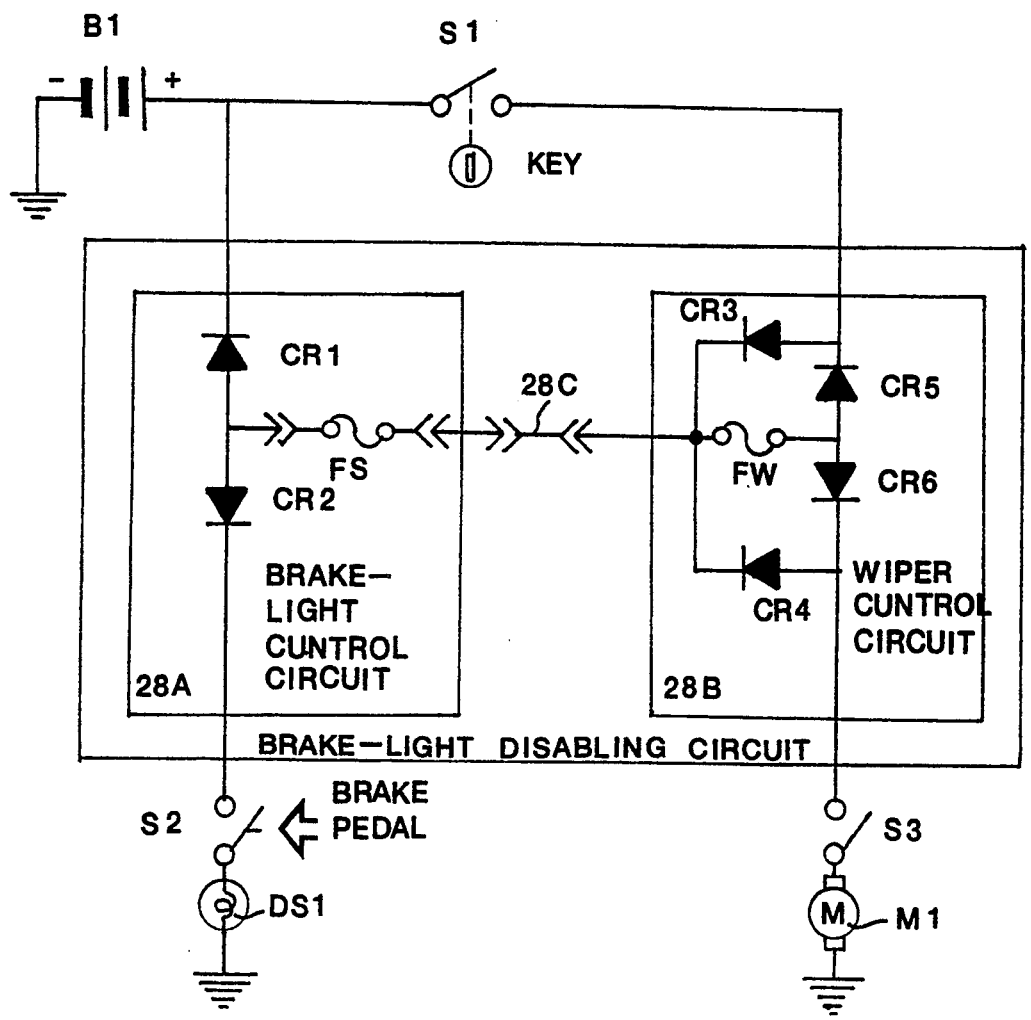
FIG. 8 is a schematic diagram of a preferred brake-light disabling circuit.
Figure 8A:
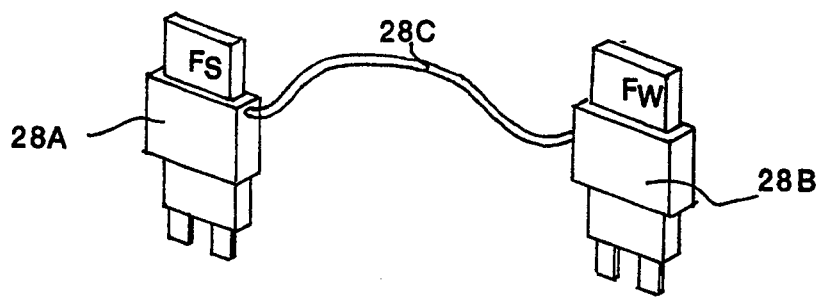
FIG. 8A is a perspective view of the physical configuration and wiring of the brake-light disabling circuit.

In order to keep the brakes engaged when the device 10 is installed, it is necessary to turn off the brake lights of the vehicle to prevent the vehicle battery from depleting all of its energy. To accomplish this task, a brake light disabling circuit 28 is employed. Such a circuit as shown in FIG. 8 and 8A consists of a brake-light control circuit 28A and a wiper control circuit 28B. These two circuits function in combination with the vehicle battery B1, a key-operated vehicle ignition switch S1, which controls the current from the battery, a brake circuit consisting of a brake-pedal operated brake switch 52 and a brake light(s) DS1, and a wiper circuit consisting of a wiper switch S3 and a wiper motor M1.

The brake light control circuit 28A consists of a first diode CR1 having its cathode connected to the positive terminal of the battery B1 and to the first side of the ignition switch S1. The anode of the first diode CR1 is connected to the anode of the second diode CR2 and to a first side of a stop light fuse FS. The cathode of the second diode CR2 is connected to the brake light circuit where the brake-light control circuit is completed.

The wiper control circuit 28B is connected to the brake-light control circuit 28A by means of a bridge lead 28C as shown in FIGS. 8 and 8A. The first end of the lead 28C is connected to the second side of the stop light fuse F5 and the second end to the first end of the wiper fuse FW.

The wiper control circuit 28B consists of a third diode CR3 having its cathode connected to the second end of the bridgelead 28C, the first side of the wiper fuse FW and to the cathode of a fourth diode CR4. The second side of the wiper fuse FW is connected to the anodes of a fifth diode CR5 and a sixth diode CR6. The cathode of the fifth diode CR5 is connected to the anode of the third diode CR3 and to the second side of the vehicle ignition switch S1. The cathode of the sixth diode CR6 is connected to the anode of the fourth diode CR4 and to the wiper blade circuit where the wiper control circuit is completed.

When the brake light control circuit 28A and wiper blade control circuit 28B are installed in the vehicle fuse box as shown in FIG. 8A, the vehicle brake light(s) DS1 and wiper blade motor M1 will only operate when the vehicle ignition switch S1 is closed. With the switch S1 closed, the brake light DS1 will illuminate when the battery current is applied from the battery B1, through the closed switch S1, the third diode CR3, the bridge lead 28C, the stop light fuse FS, the second diode CR2 and to the brake circuit. Likewise, to operate the wiper motor M1, the current from the battery B1 is applied through the closed ignition switch S1, the third diode CR3, the wiper fuse FW, the sixth diode CR6 and to the wiper circuit.

Figure 9:
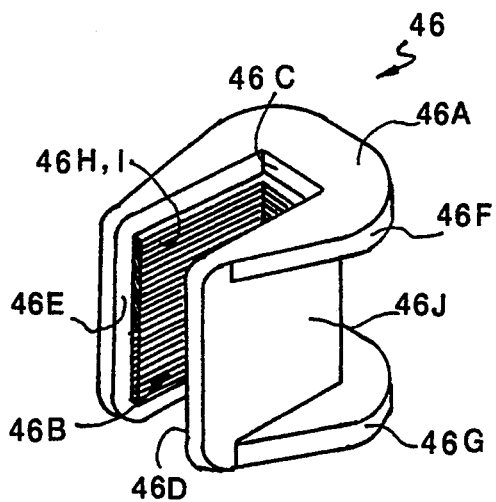
FIG. 9 is a perspective view of a device holding insert.
Figure 11:
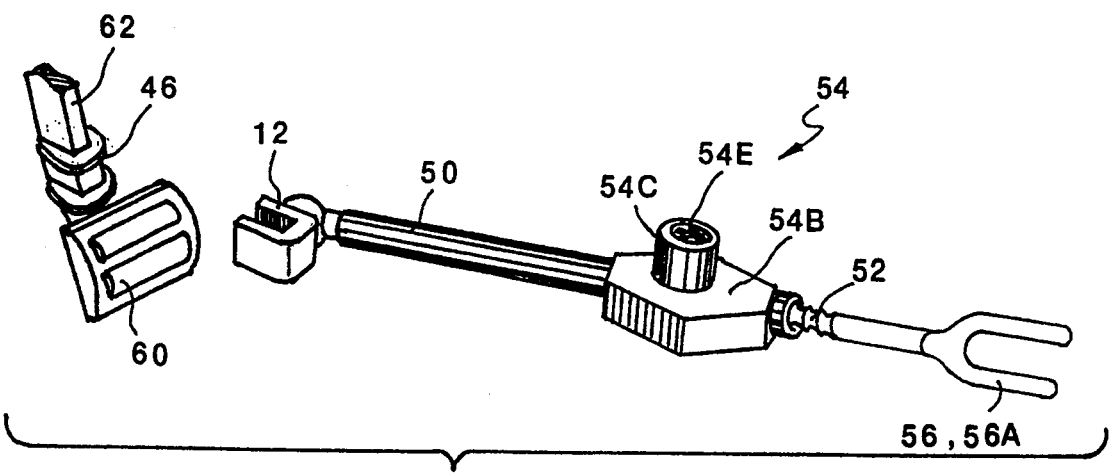
FIG. 11 is a perspective view of a device holding insert installed over a brake-pedal swing-arm and a device about to be installed into the insert.

An optional element that may be used with both the first and second embodiments to add stability to the device 10 is the device holding insert 46 as shown in FIGS. 9, 10 and 11.

The insert 46 attaches to the brake-pedal swing-arm 62 as shown in FIG. 11, and comprises a U-shaped structure 46A. The structure 46A has a brake swing-arm channel 46B that includes a forward surface 46C, a first side surface 46D and a second side surface 46E. Around the outer side surfaces is an upper lip 46F and a lower lip 46G. The two lips define an area into which is inserted and held the brake-pedal swing-arm interfacing structure 12 as shown in FIG. 11. On the inside of the channel 46B against the forward, first side and second side surfaces is attached a gripping section 46H. This section is made with external side surfaces having cross-angled teeth 46I that aid in maintaining the insert 46 secured to the brake-pedal swing-arm 62.

The second embodiment which is shown in FIGS. 12–28 is comprised of the following major elements: a front cap 30, a brake-pedal contact structure 32, a lower rotating rod structure 34, a pivot pin 36, a brake-pedal swing-arm interfacing structure 38, a rear cap-engaging bolt 40, a brake-light disabling circuit 28, a device holding insert 46, a locking tube 50, a locking rod 52 and a rod locking means 54. The above elements, as with the first embodiment, function in combination with a vehicle brake-pedal 60 that is attached to a brake-pedal swing-arm 62, a seat 64 and a vehicle-seat base structure 66 represented by a vehicle seat post 68.

Figure 12:
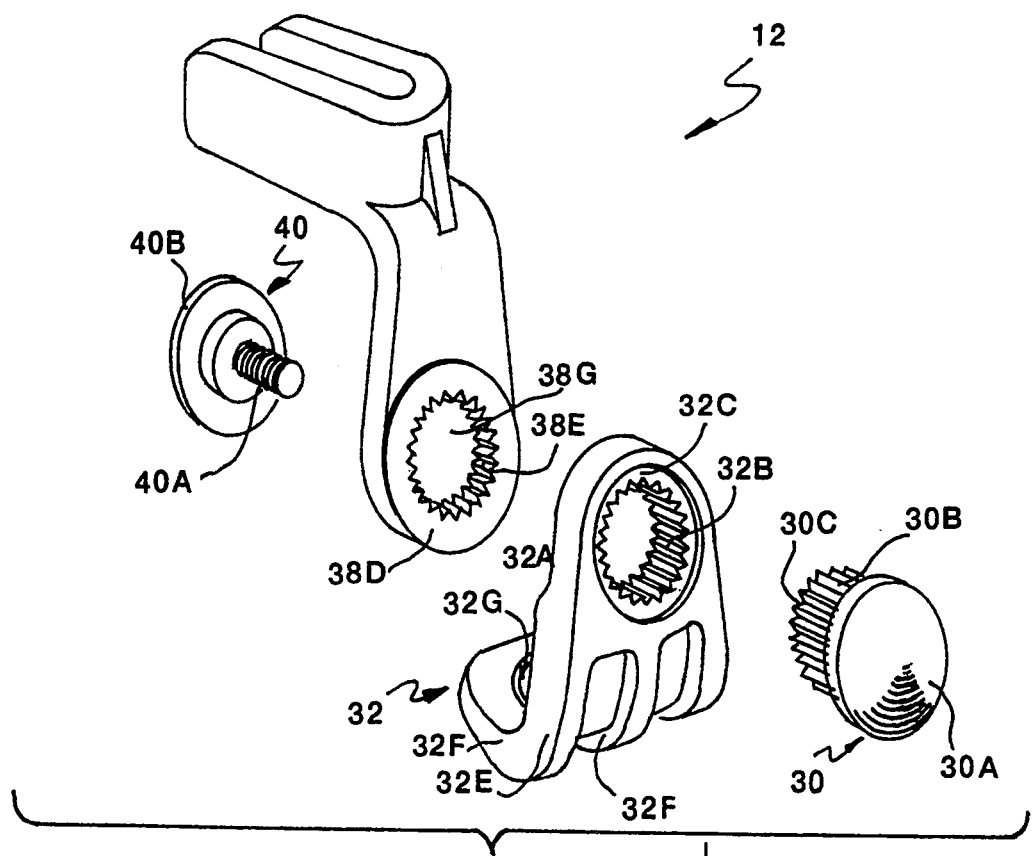
FIG. 12 is an exploded, perspective view of the brake-pedal swing-arm interfacing structure of the second embodiment.

The brake-pedal swing-arm interfacing structure 12 of the second embodiment is shown in FIGS. 12 and 13. This structure is held together by means of the front cap 30 and the rear cap-engaging bolt 40.

The front cap 30 as also shown in FIGS. 14 and 15 includes an outward head 30A and a rearward extending spline section 30B that has a threaded bore 30C extending from the outward end of the spline section 30B. The bolt 40 as best shown in FIG. 16, has attached a relatively flat head 40B that preferably includes a socket head opening 40C and bas threads that are sized to be threaded into the threaded bore 30C.

Figure 24:
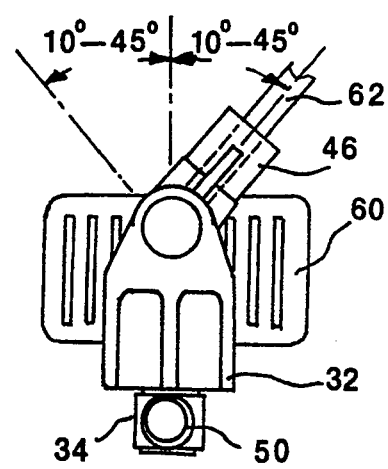
FIG. 24 is a front view of the brake-pedal swing-arm interfacing structure attached to the brake-pedal with an angular displacement.
Figure 23:
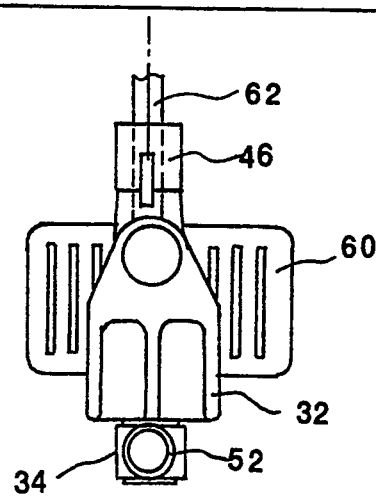
FIG. 23 is a front view of the brake-pedal swing-arm interfacing structure attached to the brake-pedal without an angular displacement.
Figure 25:
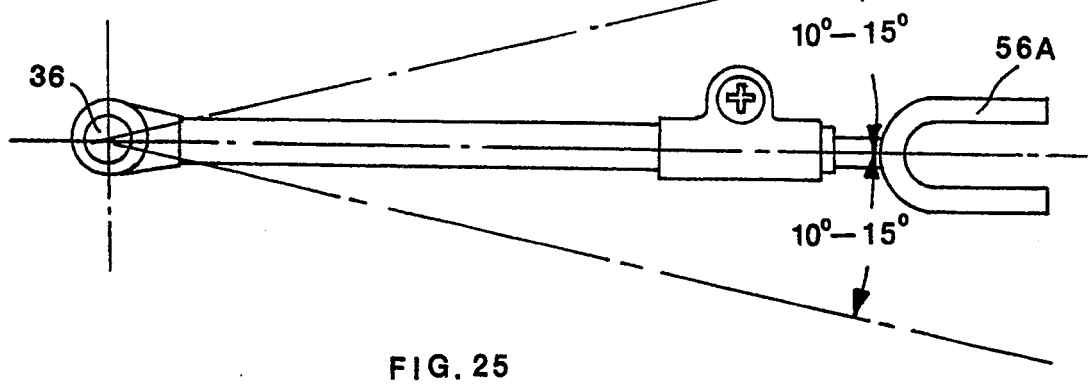
FIG. 25 is a top plan view of the device showing the horizontal displacement available.

The brake-pedal contact structure 32 as also shown in FIGS. 17 and 18 consists of an upper section 32A and a lower section 32E. The upper section as shown best in FIG. 18, has a spline bore 32B sized to receive the spline section 30B from the front cap 30. The upper section also includes a cap interfacing ledge 32C that is sized to receive and retain the outer perimeter edge of the head 30A. The lower section 32E has a plurality of curved fingers 32F as best shown in FIG. 12, that are placed over a portion of the brake pedal 60 as shown in FIGS. 13, 23 and 24. This structure also includes an upper pivot bore 32G and an optional female detent 32H as shown in FIG. 20, that forms one part of a detent assembly.

The brake-pedal contact structure 32 interfaces at its lower section 32E with the lower rotating rod structure 34. The structure 34 includes a rotating section 34A having a back section 34B that is inserted into and attached to the front end 50A of the locking tube 50 as best shown in FIG. 19, by an attachment means 50C that preferably consists of welding. Near the front section of the structure 32 is located a lower pivot bore 34C as shown in FIG. 20 that aligns with the upper pivot bore 32G. On the top surface of the rotating section 34A is captively held a male detent 34D that is in an engaging alignment with the female detent 32H to complete the detent assembly.

The brake-pedal contact structure 32 and the lower rotating rod structure 34 are rotatably held together by a harden steel pivot pin 36 as shown in FIG. 20. The pin has a shank 36A that is sized to rotatably fit into the upper and lower pivot bores 32G, 34C and a head 36B that is sized to be retained within the head cavity 34E.

The swing-arm interfacing section S8 as shown in FIGS. 13, 21 and 22 consists of an upper section 38A and a lower section 38D. The upper section as best shown in FIG. 21, has a swing-arm channel 38C that is sized to fit into the brake-pedal swing-arm 62. The lower section as best shown in FIG. 22, includes a spline bore 38E that aligns with the spline bore 32B located on the upper section 32A of the brake-pedal contact structure 32; a bolt interfacing ledge 38F that accepts the head 40B of the reap cap engaging bolt and a shank bore 38G in alignment with the threaded bore 30C on the front cap 30.

The remainder of the elements that comprise the second embodiment of the brake-pedal swing-arm interfacing structure 12 which include, the brake-light disabling circuit 28, the device holding insert 46, the locking tube 50, the locking rod 52, the rod locking means 54 and the vehicle seat interfacing means 56 are identical in form and function as described fop the first embodiment. The only exception is the different method used in each embodiment to attach the front end 50A of the locking tube 50 to the structure 12.

The assembled brake-pedal swing-arm interfacing structure 12 of the second embodiment can be vertically and horizontally pivoted to fit most designs of brake-pedal swing-arms 62. The vertical pivoting as measured from each side of a horizontal center line as shown in FIG. 4, is between 10 to 45 degrees. The horizontal pivoting as measured from the longitudinal center of the pin 20, is between 10 to 15 degrees as shown in FIG. 5.

OPERATION

Figure 26:
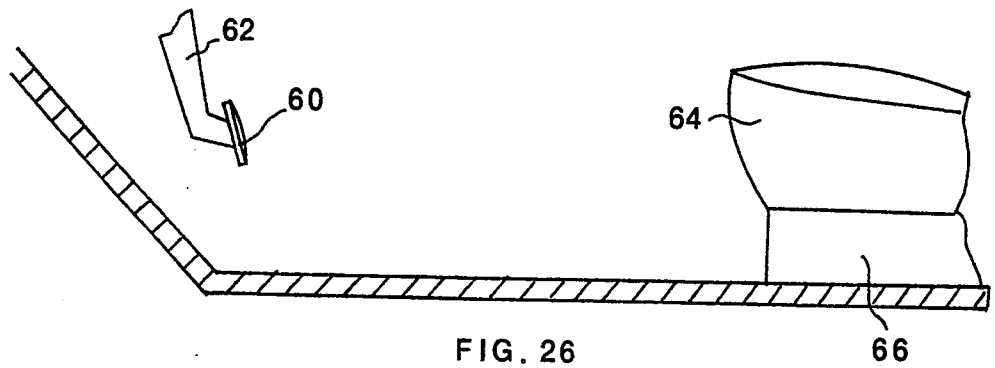
FIG. 26 is a side elevational view of a vehicle showing the location of the brake-pedal and the vehicle seat placed in its furthest back position which is accomplished prior to the installation of the device.
Figure 27:
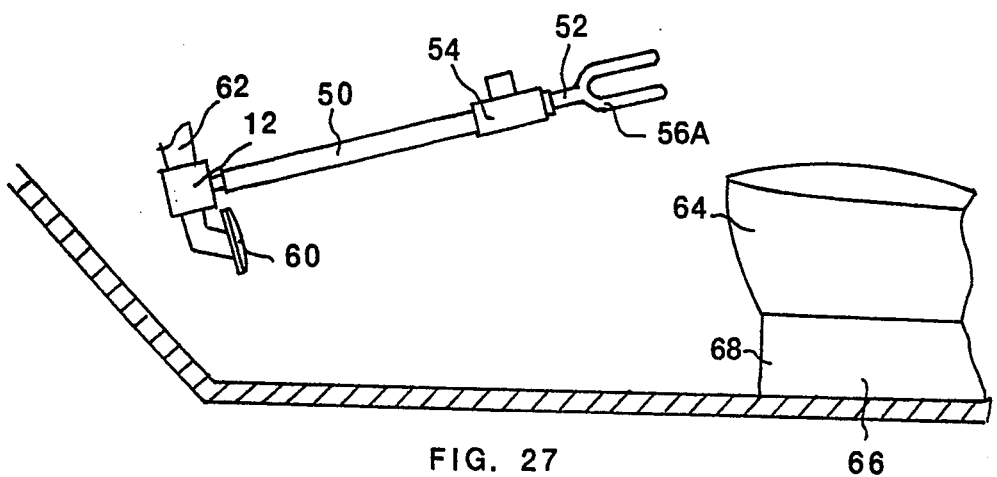
FIG. 27 is a side elevational view of a vehicle showing the initial step of attaching the vehicle seat structure interfacing means to a vehicle seat structure.

To operate either embodiments of the improved vehicle brake-pedal locking device 10, it is removed from its storage place somewhere in the vehicle and the following steps are followed:

1. The vehicle seat 64 is placed in its furthest back position as shown in FIG. 26.
2. The vehicle seat interfacing structure 56, which is illustrated as the forked section 56A, is set at a correct angle and placed between and against a vehicle seat post 68 as shown in FIGS. 7 and 27.
3. The brake-pedal swing-arm interfacing structure 12 is placed at a correct angle and inserted into the brake-pedal swing-arm 62 and the device 10 is adjusted longitudinally for length.
4. The brake-pedal 60 is depressed by means of the feet to cause the brake-pedal to be placed in a braking position.
5. The rod locking means 54 is then activated to lock the locking rod 52 in place.

Figure 28:
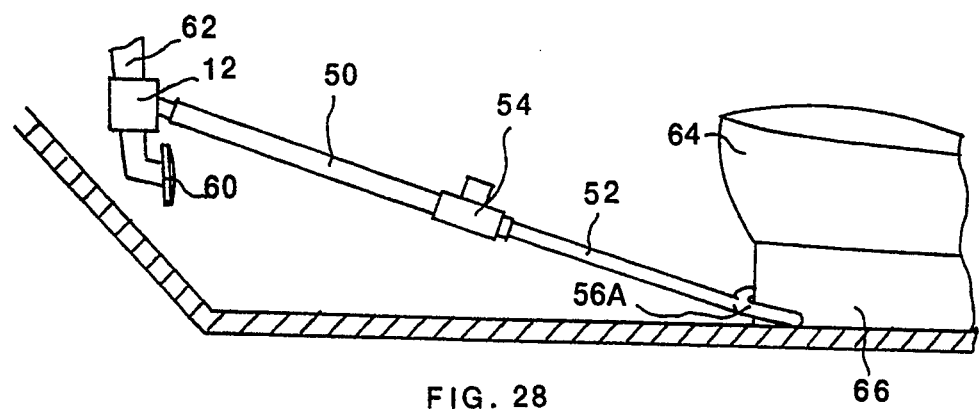
FIG. 28 is a side elevational view of a vehicle showing the device finally installed between the brake-pedal and a vehicle seat structure.

The device as shown in FIG. 28 is now installed to prevent a vehicle from being driven. Note: in some vehicles, when the engine is turned off, air may remain in the brake lines. Therefore, for maximum security, it is best to install the device 10 with the transmission in park and the engine operating.

To remove the device 10, the above procedure is simply reversed.

While the invention has been described in complete detail and pictorially shown in the accompanying drawings, it is not to be limited to such details, since many changes and modifications may be made in the invention without departing from the spirit and scope thereof. Hence, it is described to covey any and all modifications and forms which may come within the language and scope of the appended claims.

We claim:

1. An improved vehicle brake-pedal locking device for use with vehicles having a vehicle seat base structure and a foot-operated brake-pedal having left, right, upper and lower sides and that is attached to a brake-pedal swing-arm, said device comprising;
    a) a brake-pedal swing-arm interfacing structure having means for allowing said structure to be attached to the brake-pedal swing-arm,
    b) a locking tube having a front end and a back end where the front end is attached to said brake-pedal swing-arm interfacing structure by an attachment means that allows said locking tube to pivot vertically and horizontally,
    c) a locking rod having a front end, a back end and a diameter that allows said rod to slidably traverse through said locking tube, said rod having locking serrations,
    d) a rod locking means attached to the back end of said locking tube, with said locking means having a rod bore therethrough in alignment with said locking tube, where when said locking rod is inserted through the rod bore and through said locking tube said locking means can lock said locking rod at a selectable length, and
    e) a vehicle seat interfacing means attached to the back end of said locking rod, where said interfacing means is configured to allow said device to be held in-place when said interfacing means interfaces with a structural member of the vehicle seat base structure, where when so held with said brake-pedal swing-arm interfacing structure placed over the brake swing-arm, a foot pressure can be applied to said brake-pedal to cause the brake-pedal to depress at which time said rod locking means is activated to allow said locking rod to remain locked in its extended position and allow said improved vehicle brake-pedal locking device to maintain the brake-pedal in its depressed braking position.

2. The device as specified in claim 1 wherein said brake-pedal swing-arm interfacing structure comprises:
    a) a U-shaped section having a front opening channel with a back section, an outward side section and an inward side section, with said inward side section having a threaded swing-screw bore therethrough, where said channel is sized to fit over the brake-pedal swing-arm,
    b) a front, substantially square, hollow structure having a back opening, a top section, a bottom section, an outward section and an inward section, and having a first pin bore extending through the top and bottom sections and a swing screw, where said screw screws into said threaded swing screw bore to allow said front hollow structure to pivot vertically from between 15 to 25 degrees, in an up or down direction as measured from a horizontal center line (CL) that traverses through the center of said brake-pedal swing-arm interfacing structure,
    c) a front solid section sized to be contained within said hollow structure, said solid section having a front end, a back end which constitutes the back end of said brake-pedal swing-arm interfacing structure, a top surface, a bottom surface, an outer surface and an inward surface, where the inward surface has a taper that narrows towards the front end and having a second pin bore extending through the top and bottom surfaces in alignment with said first pin bore, and d) a swivel pin inserted into the first and second pin bores, where said pin allows said front solid section to pivot horizontally from between 10 to 15 degrees, as measured from a vertical line that traverses through the center of said swivel pin, where the amount of the horizontal swing is limited by the taper on said solid section.

3. The device as specified in claim 2 further comprising a washer inserted over said swing screw between the inward section of said front, hollow structure and the inward side section of said swing-arm interfacing structure.

4. The device as specified in claim 2 further comprising a flexible gripping insert that attaches, by an attachment means, to the side sections of said front opening channel, where when said swing screw is rotated, a force is applied to the inward section of said insert causing an inward section to move inwardly and place a gripping force on the brake-pedal swing-arm.

5. The device as specified in claim 4 wherein said flexible brake-pedal swing-arm insert is made with external side surfaces having cross-angled teeth that aid to maintain the insert secured to the brake-pedal swing-arm.

6. The device as specified in claim 2 wherein the back end of said solid section is inserted into and welded to the front end of said locking tube.

7. The device as specified in claim 2 wherein said locking rod further comprises a multiplicity of locking serrations extending longitudinally along said rod.

8. The device as specified in claim 2 wherein said rod locking means comprises:
a) a locking structure having:
(1) two laterally extending sides that extends beyond the diameter of said locking tube, and
(2) a key-lock cylinder keeper attached along the edge of one of the laterally extending sides of said locking structure, and
b) a key-lock cylinder inserted into and retained by said key-lock cylinder keeper and having a key-moved latch that when placed in its locked position by a key, the latch extends into the rod bore and into one of the locking serrations on said locking rod, where said latch maintains said motor vehicle brake-pedal locking device in its locked position.

9. The device as specified in claim 2 wherein a vehicle seat structure locking means comprises a fork that is placed between and against a vehicle seat post.

10. The device as specified in claim 2 further comprising a brake light deenergizing circuit means that disengages the brake lights from the vehicle's electrical system when said device is locked in place in the vehicle.

11. The device as specified in claim 10 wherein said brake-light disabling circuit means comprises a brake-light disabling circuit that operates in combination with a vehicle battery (B1), a vehicle ignition switch (S1), a brake light circuit consisting of a brake-operated switch (S2), that controls the operation of a brake light (DS1) and a wiper-blade circuit consisting of a wiper brake switch (S3) that controls the operation of a wiper blade motor (M1), said circuit comprising:
a) a brake light control circuit further comprising a first diode (CR1) having its cathode connected top the positive terminal of the vehicle battery (B1) and to the first side of the vehicle ignition switch (S1) and its anode connected to the anode of a second diode (CR2) and to a first side of a stop light fuse (FS), where the cathode of said second diode (CR2) is connected to the brake light circuit,
b) a bridge lead having a first end and a second end, where the first end is connected to the second side of said stop light fuse (FS),
c) a wiper control circuit further comprising a third diode (CR3) having its cathode connected to the second end of said bridge lead, the first side of a wiper fuse (FW) and to the cathode of a fourth diode (CR4), where the second side of said wiper fuse (FW) is connected to the anodes of a fifth diode (CR5) and a sixth diode (CR6) and where the cathode of the fifth diode (CR5) is connected to the anode of said third diode (CR3) and to the second side of the vehicle ignition switch (S1), and where the cathode of said sixth diode (CR6) is connected to the anode of the fourth diode (CR4) and to the wiper blade circuit, where when said brake light control circuit and said wiper control circuit are installed, the brake lights (DS1) and wiper blade motor (M1) will only operate when the vehicle ignition switch is closed, whereupon if the brake light is to illuminate, the current from the vehicle battery (B1) is applied through the closed switch (S1), said third diode (CR3), said bridge lead, the stop light fuse (FS), said second diode (CR2) and to the brake circuit, likewise, to operate the wiper motor (M1), the current from the vehicle battery is applied through the closed switch (S1), said third diode (CR3), the wiper fuse (FW), said sixth diode (CR6) and to the wiper circuit.

12. The device as specified in claim 1 further comprising a device holding insert that attaches to the brake swing-arm, said device holding insert comprising:
a) a U-shaped structure having:
(1) a brake swing-arm channel with a forward surface, a first side surface and a second side surface,
(2) an upper lip and a lower lip where the two lips define an area into which is inserted and held said brake-pedal swing-arm interfacing structure and,
b) a gripping section attached to the forward, first side and second side surfaces of the brake swing-arm channel, where the gripping section prevents said device holding insert from moving in a longitudinal direction across the surface of the brake-pedal swing-arm.

13. The device as specified in claim 12 wherein said gripping section is made with external side surfaces having cross-angled teeth that aid in maintaining said insert secured to the brake-pedal swing-arm.

14. The device as specified in claim 1 wherein said brake-pedal swing-arm interfacing structure comprises:
a) a front cap having an outward head and a rearward extending spline section having a threaded bore,
b) a brake-pedal contact structure comprising:
(1) an upper section having a spline bore sized to receive the spline section from said front cap and further having a cap interfacing ledge sized to receive the outer perimeter edge of the front cap head,
(2) a lower section having a plurality of curved fingers, and an upper pivot bore,
c) a lower rotating rod structure comprising a rotating section having a back section and a front section having a lower pivot bore in alignment with the upper pivot bore and a head cavity, d) a pivot pin having a shank sized to rotatably fit into the upper and lower pivot pin bores and a head sized to be retained within the head cavity, where said pin includes a means for rotatably captivating the pin within the upper and lower pivot pin bores, e) a swing-arm interfacing section comprising:
   (1) an upper section having a swing-arm channel sized to fit onto the brake-pedal swing-arm,
   (2) a lower section having a spline bore that aligns with the spline bore on the upper section of said brake-pedal contact structure, a bolt interfacing ledge and a shank bore in alignment with the threaded bore on said front cap, and f) a rear cap-engaging bolt having a threaded shank attached to a head wherein said threaded shank is threaded into the threaded bore on said front cap.

15. The device as specified in claim 14 wherein said vertical and horizontal pivoting as measured from each side of a center line, is between 10 to 45 degrees and 10 to 15 degrees respectively.

16. The device as specified in claim 15 wherein the back section of said lower rotating rod structure is inserted into and welded to the front end of said locking tube.

17. The device as specified in claim 15 further comprising a detent assembly consisting of a female detent located on the lower section of said brake-pedal contact structure and a male detent located on said lower rotating rod structure, where said male detent is in an engaging alignment with said female detent.

18. The device as specified in claim 15 wherein said locking rod further comprises a multiplicity of locking serrations extending longitudinally along said rod.

19. The device as specified in claim 15 wherein said rod locking means comprises:
   a) a locking structure having:
      (1) said rod bore therethrough that is in alignment with said locking tube and that is sized to slidably accept said locking rod,
      (2) at least one laterally extending side that substantially extends beyond the diameter of said locking tube, and
      (3) a key-lock cylinder keeper attached along the edge of one of the laterally extending sides of said locking structure, and
   b) a key-lock cylinder inserted into and retained by said key-lock cylinder keeper and having a key-moved latch that when placed in its locked position by a key, the latch extends into the rod bore and into one of the locking serrations on said locking rod, where said latch maintains said motor vehicle brake-pedal locking device in its locked position.

20. The device as specified in claim 15 wherein said vehicle seat interfacing means comprises a fork section that is placed between and against a vehicle seat post.

* * * * *